UNITED STATES PATENT OFFICE.

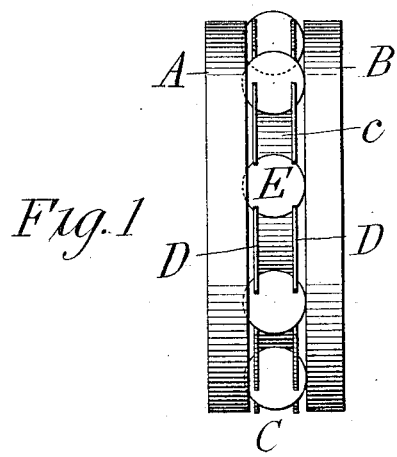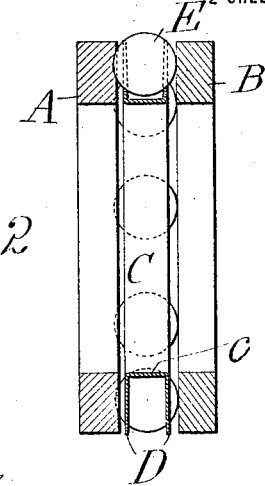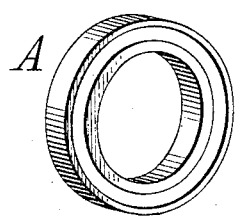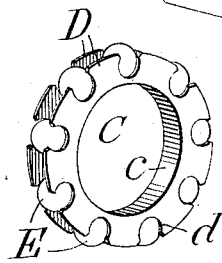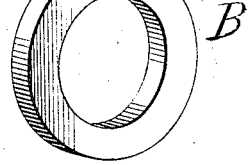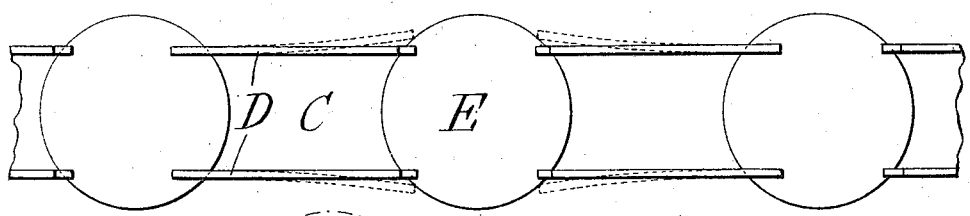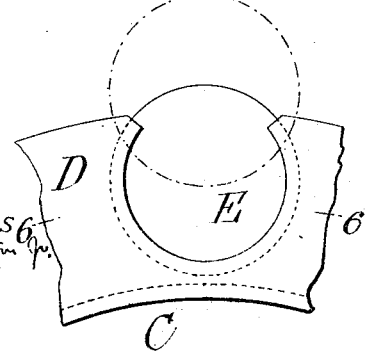

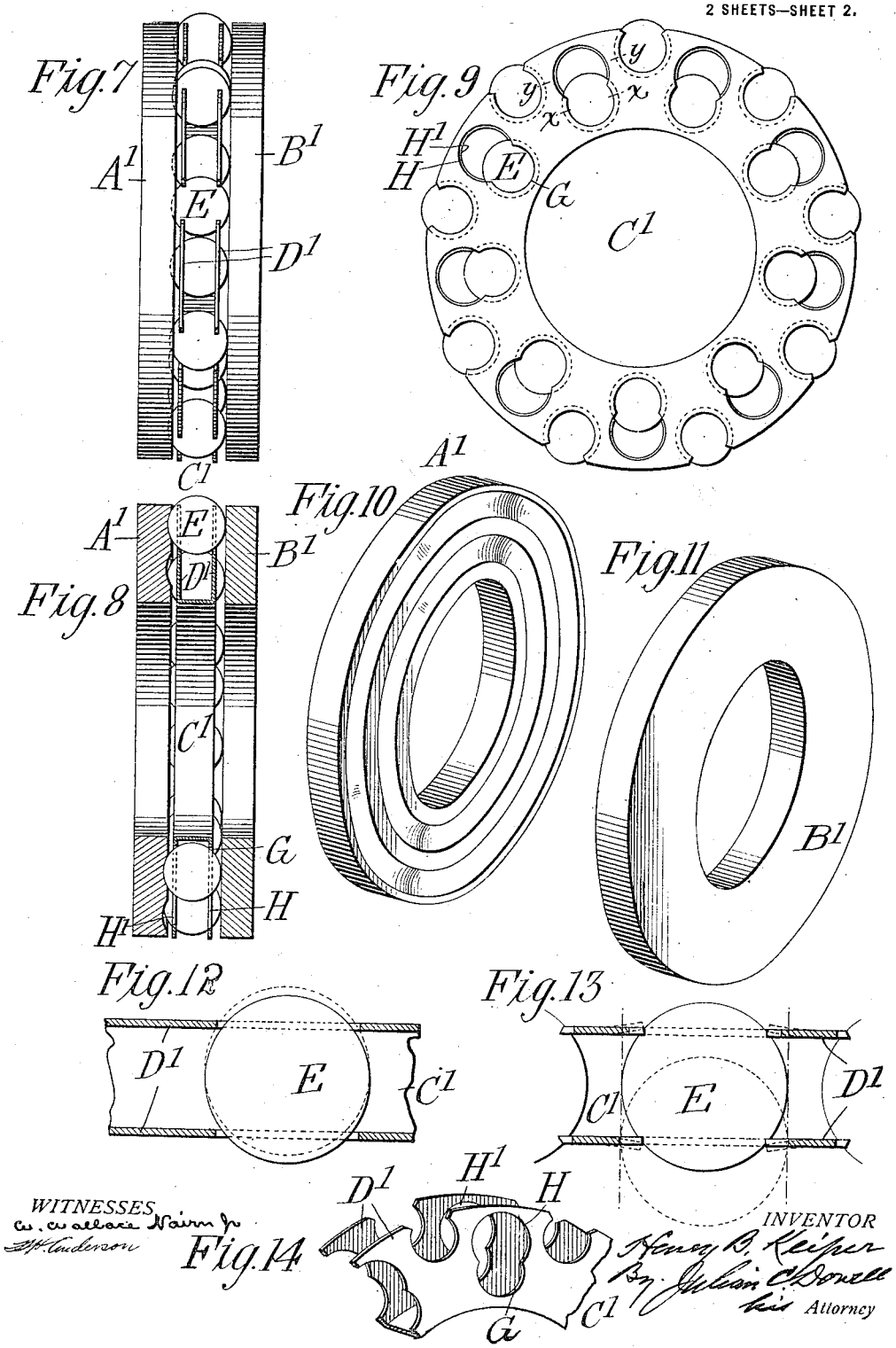

HENRY BRINSER KEIPER, OF LANCASTER, PENNSYLVANIA.

END-THRUST BEARING.

1,269,087.  Specification of Letters Patent.  Patented June 11, 1918.

Application filed December 4, 1912. Serial No. 734,957.

*To all whom it may concern:*

Be it known that I, HENRY B. KEIPER, a citizen of the United States, residing at Lancaster, in the county of Lancaster and State of Pennsylvania, have invented certain new and useful Improvements in End-Thrust Bearings; and I do hereby declare the following to be a full, clear, and exact description of the invention, such as will enable others skilled in the art to which it appertains to make and use the same.

This invention relates to anti-friction bearings for sustaining end thrust, in which spherical rollers or balls are used; and more particularly to an elastic cage for spacing said spherical rollers.

The objects of the invention are to provide a simple, cheap, and durable cage capable of allowing the balls to be easily assembled by hand without the use of any tools, also to allow for easily replacing the balls if broken without taking the cage apart, as is necessary in almost all of the known forms of cages now in use, and further to provide a retainer which will permit the balls to run loosely and freely so that if they vary in diameter they will nevertheless run in the same race, whereas in the forms of retainers now in use in which the balls are held tightly any slight variation in diameter causes each ball to wear a separate race-way in the bearing surfaces or plates.

The invention will first be hereinafter more particularly described, with reference to the accompanying drawings, which form a part of this specification, and then pointed out in the claims at the end of the description.

In said drawings,

Figure 1 is a front elevation of a ball bearing with my improved cage filled with balls and fitting between opposed bearing plates or disks;

Fig. 2 is a vertical sectional elevation of the same;

Fig. 3 is a perspective view on a reduced scale of the ball retaining cage, and bearing plates disassembled;

Fig. 4 is a detail view on an enlarged scale of a portion of the ball cage, showing in dotted lines the position of the flanges when the ball is "snapped" into place;

Fig. 5 is a detail side view of a portion of the ball cage illustrating in full and dotted lines the method of inserting the balls;

Fig. 6 is a section taken on the line 6—6 of Fig. 5;

Fig. 7 is a front elevation of a modfication of the invention, showing a cage with two rows of balls;

Fig. 8 is a vertical section of said modification;

Fig. 9 is a side elevation of the cage used in the modification shown in Figs. 7 and 8;

Figs. 10 and 11 are perspective views of the bearing plates;

Figs. 12 and 13 are detail cross-sections taken on the lines X—X and Y—Y respectively of Fig. 9, and Fig. 14 is a detail perspective view of a portion of the ball retaining cage shown in Figs. 7 and 11.

Referring to said drawings, in which the same letters of reference are used to denote corresponding parts in different views, the letters A and B may denote bearing plates, the plate A having an annular groove or race way, in which the annular series of balls travel, while the plate B has a smooth bearing surface. Between these plates is fitted an annular ball retaining case C consisting of a ring-shaped body $c$ provided with externally projecting annular flanges D, having oppositely disposed lateral openings $d$ to receive spherical rollers or balls E which project through the openings in the flanges so as to permit them to take end thrust. The lateral openings $d$ in the flanges are approximately U-shaped so that they open outwardly at the periphery of the flanges, leaving approximately sectoral intervening portions which are adapted to spring apart sufficiently to permit the insertion of a ball, as illustrated in Figs. 3, 4, 5 and 13, the distance between the points of two adjacent sectoral portions being slightly smaller than the largest diameter of a ball so that when snapped into place it will be prevented from escaping by contact with sectoral portions of the flanges between the lateral openings. These openings are circular in form to an extent somewhat greater than the diameter of that part of the ball which normally comes in contact with the retainer, so as to permit easy and free rotation thereof, and yet not so great as the greatest diameter of the ball, so that the retainer will hold the ball in position, and the balls cannot be inserted laterally through the openings but are placed radially between the two flanges as far within the lateral openings as they will extend without pressure, whereupon a slight push will snap them into place, the sectoral portions of the flanges yielding laterally as indicated in Figs. 4 and 13.

I preferably cut or sheer off the points of the sectoral portions of the cage or retainer so as to present to the surface of the balls preparatory to inserting them a line contact instead of a sharp pointed contact, which would be present were the circular opening alone cut in the retainer. This will allow the balls to be inserted more readily and render the retainers of small size less liable to break or chip during the insertion of the balls.

I have shown in Figs. 7 to 14 a modification of my retainer designed for use with a plurality of rows of balls, $A^1$ and $B^1$ denoting the bearing plates and $C^1$ the retainer. The lateral openings for the outer row of balls are constructed substantially the same as those described for the single row of balls, but in order to provide for the insertion of another row or rows of balls a series of oppositely disposed openings G for seating the balls similar to those already described, is provided in the annular flanges $D^1$, opening out into a series of oppositely disposed openings H and $H^1$ through one of which the balls may be inserted and placed in position to be snapped into their respective seats. The latter openings may vary somewhat in diameter, the openings H in one of the flanges being preferably somewhat larger, while the corresponding openings $H^1$ in the other flange are somewhat smaller than the diameter of the balls, said openings being bounded by lines which intersect the opening in which the balls are seated at a point between their axes and their circumferences, so that when a ball is introduced through one of the openings and placed in position between the two flanges to be forced into its seat it may be snapped into position in the same manner that the balls are inserted between the oppositely disposed openings of the outer row, that is to say, assuming that the retainer is placed in a horizontal position, the balls may be dropped laterally through the larger of the oppositely disposed openings in one of the flanges, and will rest in the corresponding smaller openings in the other flange; the balls now lying radially with respect to the inner openings or ball-seats may be snapped into their seats in the same manner as the balls in the outer row, the flanges yielding laterally as shown in Fig. 13.

The utility and advantages of my improved cage are obvious. A retainer is provided in which the balls are loosely housed, giving them considerable lateral play, so that they will all seek and run in the same race regardless of slight differences in size, whereas all the old retainers hold the balls firmly, any difference in size resulting in each ball forming its own particular race. Further, the retainer or cage may be manufactured and sold separately and easily filled by hand by the ultimate consumer, and if any of the balls break, they can be replaced without taking the cage apart. The cage is capable of accommodating more balls than any heretofore made, and may be made with as many rows of balls as is desirable.

It will be understood of course that while I have shown in each case bearing plates having a race or races in one plate only in which the balls may run that the invention is capable of use with or without such plates and with races in one or both plates, or with no races at all; also that though only a one and two row bearing is illustrated that I do not desire to be limited to any given number of rows of balls. It will also be understood that various changes may be made in the illustrated embodiment of my invention without departing from its spirit and scope, such for instance as the use of some other anti-friction device in the place of the balls, as rollers or some other equivalent.

Having thus described my invention what I claim as new and desire to secure by Letters Patent of the United States is:

1. A ball bearing comprising a ring-shaped body provided with spaced peripheral projections and balls seated in the spaces between such projections, the ball-seating spaces being circular in form but less than a complete circle and opening outwardly on curved converging lines, and the projections being elastic adapting the balls to be sprung into the spaces therebetween, and a series of oppositely disposed openings in said flanges in which balls are seated and which open outwardly on converging lines into larger intersecting openings through which the balls are inserted and then sprung into their seats.

2. A ball retaining cage consisting of a ring-shaped body having flanges extending outwardly therefrom, and provided with a plurality of series of lateral openings in said flanges, the openings of the outer series opening outwardly at the periphery of the flanges, which are adapted to yield to permit the insertion of the balls between oppositely disposed openings, the inner series of openings opening into another series of larger sized openings through which balls may be inserted laterally and then snapped radially into the smaller openings.

3. A ball retainer comprising an annular body having spaced peripheral flanges provided with a series of oppositely disposed openings therein which open outwardly on converging lines into larger intersecting openings through which balls may be inserted laterally and then sprung into the seats provided therefor by the smaller openings, said flanges being also provided with an outer series of oppositely disposed openings which open outwardly at the periphery of the flanges and provide another series of ball-seating spaces therebetween into which the balls are sprung, substantially as described.

In testimony whereof I affix my signature in the presence of two witnesses.

HENRY BRINSER KEIPER.

Witnesses:
JEANETTE R. LONG,
CHAS. E. LONG.

Copies of this patent may be obtained for five cents each, by addressing the "Commissioner of Patents, Washington, D. C."